Figure 3:
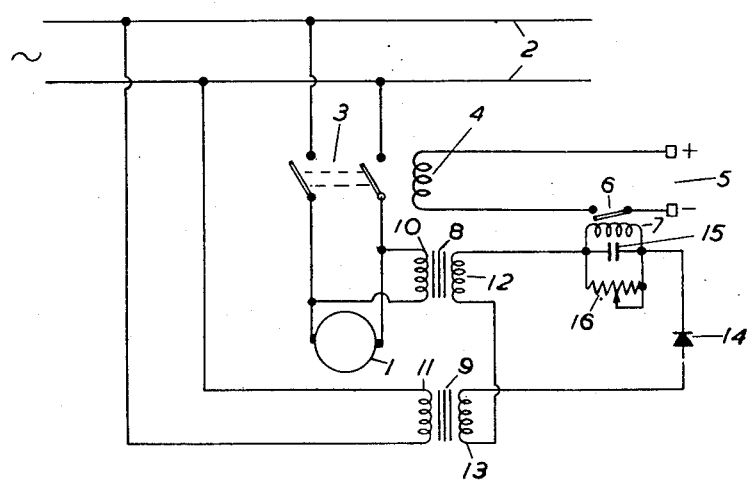

April 13, 1954         J. C. MILNE         2,675,492
AUTOMATIC ALTERNATOR SYNCHRONIZER
Filed March 23, 1953         2 Sheets-Sheet 1
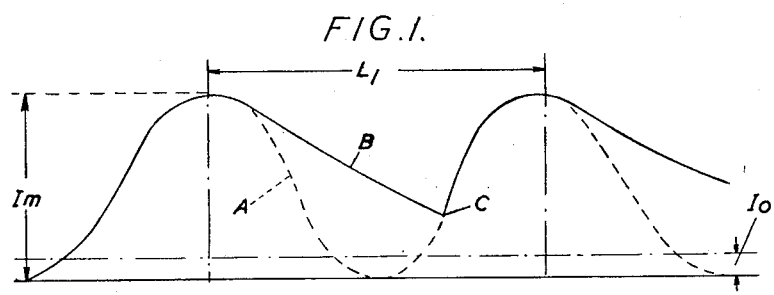
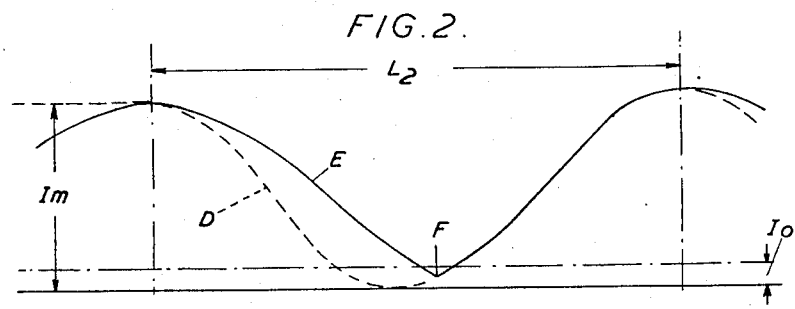
Inventor
John Charles Milne
By Ralph B. Stewart
Attorney April 13, 1954

J. C. MILNE 2,675,492

AUTOMATIC ALTERNATOR SYNCHRONIZER

Filed March 23, 1953

2 Sheets—Sheet 2

Inventor
John Charles Milne
By Ralph B. Stewart
Attorney

Patented Apr. 13, 1954

2,675,492

UNITED STATES PATENT OFFICE 2,675,492

AUTOMATIC ALTERNATOR SYNCHRONIZER

John Charles Milne, Wolverhampton, England, assignor to Electric Construction Company Limited, Wolverhampton, England Application March 23, 1953, Serial No. 344,066

2 Claims. (Cl. 307—87)

When an alternator is to be connected in parallel with an independent source of alternating current so as to supply a portion of the load, it is, of course, important that when the connection is made, the frequency of the alternator voltage should be substantially the same as that of the source, and also that the two voltages should be in phase so as to avoid heavy circulating currents. The simplest method of obtaining an indication of these conditions is by the use of synchronising lamp supplied by the voltages derived respectively from the source and from the alternator and connected in opposition to one another. Assuming that the peak values of these two voltages are substantially equal, when the two are in phase they will cancel out and the lamp will not be illuminated. On the other hand, when the two voltages are in antiphase, the resultant voltage supplied to the lamp will be a maximum and the illumination will, therefore, be a maximum. If, therefore, the frequency of the alternator is slightly different from that of the source, the voltage supplied to the lamp will vary continuously from a maximum to a minimum and the lamp will vary in brilliance at a frequency corresponding to the difference of the two frequencies, or in other words, the beat frequency of the two sources.

If there is a considerable difference in frequency, the beat frequency will be large and the synchronising lamp will flicker rapidly. The operator must, therefore, control the speed of the alternator to bring down the beat frequency, and then when it has reached a small value, he must wait until the lamp is unilluminated, showing that the two sources are in phase with one another, when he may safely connect the alternator in parallel with the independent source. This common method of synchronisation, however, requires not only careful observation by the operator, but also involves manual operation of a circuit breaker to connect the alternator in parallel with the source when the correct conditions are obtained. It is the object of the present invention to provide means for automatic synchronisation so that the speed of the alternator has merely to be regulated and when the beat frequency reaches a safe low value and the two sources are in phase with one another, the alternator is automatically connected in parallel with the source.

According to the invention, therefore, voltages corresponding respectively to the voltage of the alternator and to that of the source and having substantially equal peak values are connected in opposition to one another, and the rectified resultant is applied to the ends of the coil of an electromagnetic relay, which is shunted by a condenser of substantially greater capacity than that required merely to smooth out the power frequency component of the voltage, so that the electromagnetic relay becomes de-energised and thus serves to connect the alternator in parallel with the independent source when the current in the coil drops to a value corresponding to a difference of frequency at which the alternator may be paralleled with safety. In order that the invention may be more fully explained, it will now be more fully described in connection with an example of a circuit arrangement and with reference to the accompanying drawings, in which:

Figures 1 and 2 are diagrams showing the wave form of current flowing in the relay coil for two values of the difference of frequency; and Figure 3 is a circuit diagram of a synchroniser according to the invention.

Referring first to Figure 1, the rectifier used to rectify the resultant current flowing in the relay coil, which may conveniently by a half-wave rectifier, will allow current to flow only in one direction, and these alternate waves will vary from a maximum when the voltages are out of phase to a minimum when they are in phase, as already described. Normally, these current impulses have an approximately smooth wave form, indicated by the dotted curve shown at A in Figure 1. Thus the current in the impedance varies at the beat frequency between a maximum value equal to $I_m$ and a minimum value equal to zero. In practice, however, due to the condenser connected in parallel with the relay coil, which is of greater capacity than that merely required to smooth out the power frequency component of the voltage, instead of the current decaying to zero as in the curve A, current flows from the condenser and tends to slow down the rate of decay of current. This condition is represented by the full line curve B and it will be seen that this intersects the rising curve at C so that the current in the relay coil is never allowed to drop to zero. The relay is designed so that it becomes de-energised to close its back contacts as soon as the current flowing in the coil drops below a value equal to $I_o$, represented by the chain dotted line in Figure 1. As will be seen from Figure 1, in which the time period at the beat frequency is relatively short, in fact, equal to twice $L_1$, the current in the relay coil never drops as low as $I_o$ and thus the relay, is maintained permanently energised.

In the condition shown in Figure 2, the time period at the beat frequency, equal to twice L2, is appreciably greater and the beat frequency is correspondingly less. Without the condenser the wave form would follow the dotted curve D. Owing to the provision of the condenser, however, the full line curve E is followed and it will be seen that the presence of the condenser produces a smaller rate of decay of the current in the relay coil than that shown at B. By reason of the greater wave length, however, the trough representing the minimum current condition is wider, so that the curve E intersects the rising curve at F, which, as may be seen, corresponds to a value of current slightly less than the predetermined value Io. Thus the relay becomes de-energised, and closes its back contacts to complete a circuit for connecting the alternator in parallel with the other source.

It will thus be understood that the minimum value of the current flowing in the relay coil will depend on the beat frequency, and the smaller the beat frequency is, the lower the minimum value of the current flowing will be. For any particular value of the beat frequency, the minimum current will obviously depend on the relative values of the impedance of the relay coil and of the capacity of the condenser and these are so chosen that the minimum value of the current drops to its predetermined value Io when the beat frequency has reached a value at which it is considered safe to parallel the alternator with the other source.

Referring to Figure 3, an alternator 1 is arranged to be connected to a separate source of alternating current represented by power lines 2, which may be connected to a second alternator or other source of supply. The alternator is connected to the mains by way of a double-pole circuit breaker 3 operated by a coil 4, which is supplied from a source of direct current 5.

The contacts 6 of a relay 7 are included in the circuit of the coil 4. Voltages corresponding respectively to the voltage of the alternator 1 and that of the source 2 are derived from transformers 8 and 9, the primary winding 10 of the transformer 8 being connected across the alternator terminals, and the primary winding 11 of the transformer 9 being connected directly across the mains supply 2. The secondary windings 12 and 13 are connected in opposition and the circuit is completed by the coil of the relay 7 and a half-wave rectifier 14. The relay coil 7 is shunted by a condenser 15 and by a variable resistance 16. The turns ratios of the two transformers 8 and 9 are equal so that, when the voltage of the alternator 1 and the mains supply 2 are equal and in phase, the resultant voltage across the secondary windings 12 and 13 is zero.

The magnitude of the condenser 15 in relation to the impedance of the coil 7 is selected in the manner already described so that the relay becomes de-energised as soon as the beat frequency falls to a value at which the alternator can safely be connected in parallel with the mains supply 2. As soon as the relay 7 becomes de-energised, the contacts 6 are closed, completing the circuit to the coil 4 of the circuit breaker 3, and thus automatically connecting the alternator in parallel with the main supply. Variation of the resistance 16 controls the proportion of the current flowing through the coil 7 and thus enables adjustment to be made of the beat frequency at which the alternator is paralleled.

In a particular example, the resistance of the coil 7 is 6,000 ohms, the capacity of the condenser 15 is 6 microfarads, and the total value of the resistance of the shunt 16 is 10,000 ohms. With these values and with the tapping in the middle of the resistance 16, the alternator is paralleled when the period corresponding to the beat frequency is four seconds. Adjustment of the tapping points then gives de-energisation of the relay up to a time period of eight seconds, thus giving a wide range of control for paralleling the alternator.

It will be understood that the operation of paralleling is entirely automatic. The only action required by the operator is slowly to adjust the speed and excitation of the alternator so as to bring its frequency and voltage towards those of the separate source. As soon as the frequencies are sufficiently closely equal to enable the alternator to be paralleled with safety, the circuit breaker 3 is automatically closed at the instant when the two voltages are in phase so that the degree of shock to the system is reduced to a small value and the alternator is then locked in synchronism with the separate source. Furthermore, if the voltages of the alternator and separate source are not substantially equal, even though they are of the same frequency and phase, the current through the relay coil will not drop to a sufficiently low value to parallel the two, and this further minimises the risk of shock to the system.

The synchroniser described herein forms an alternative to that described in my co-pending application Serial No. 344,065, filed March 23, 1953, in which is described a synchroniser containing thermionic valves.

I claim:

1. Apparatus for automatically paralleling a source of alternating current with a second source of alternating current when the difference in frequency between the said sources drops to a safe value, comprising in combination two transformers, a primary and a secondary winding on each of said transformers, said primary windings being connected each across one of said sources, and said secondary windings being connected together in series so that their output voltages are in opposition, a rectifier, a relay having a coil and a pair of contacts, said contacts being arranged to close when said coil is de-energised, said rectifier and relay coil being connected in series across said secondary windings, a condenser connected in parallel with said relay coil, said condenser being of substantially greater capacity than that required merely to smooth out the power frequency component of the voltage appearing across said relay coil, whereby the relay coil becomes de-energised and serves to close said contacts to connect the said two sources in parallel when the current in the said relay coil drops to a value corresponding to said safe value of the difference in frequency.

2. Apparatus according to claim 1, wherein a variable resistance is connected in parallel with said relay coil to vary the value of the difference of frequency at which the said two sources are connected in parallel.

No references cited.